(12) United States Patent
Schier et al.

(10) Patent No.: US 6,233,316 B1
(45) Date of Patent: May 15, 2001

(54) VOICE ENHANCED PHONE CARD

(75) Inventors: John E. Schier; Robert C. Morgan, both of Austin, TX (US)

(73) Assignee: DSC Telecom, L.P., Plano, TX (US)

( * ) Notice: Subject to any disclaimer, the term of this patent is extended or adjusted under 35 U.S.C. 154(b) by 0 days.

(21) Appl. No.: 09/013,770

(22) Filed: Jan. 27, 1998

(51) Int. Cl.$^7$ .......................... H04M 1/64; H04M 11/00; H04M 17/00

(52) U.S. Cl. ..................... 379/88.03; 379/88.03; 379/91.02; 379/100.04; 379/144

(58) Field of Search .................. 379/114, 144, 379/145, 149, 151, 154, 219, 222, 243, 258, 260, 67.1, 88.01, 142, 88.18, 88.03, 91.01, 91.02, 93.02, 100.04, 127, 265, 355, 88.19

(56) References Cited

U.S. PATENT DOCUMENTS

| | | | |
|---|---|---|---|
| Re. 32,012 | 10/1985 | Pirz et al. ............................. | 704/275 |
| 4,928,302 | 5/1990 | Kaneuchi et al. ................ | 379/88.03 |
| 5,054,053 | 10/1991 | Sakanishi ............................ | 455/563 |
| 5,127,043 | 6/1992 | Hunt et al. ....................... | 379/88.02 |
| 5,136,633 * | 8/1992 | Tejada et al. .................... | 379/91.02 |
| 5,163,086 * | 11/1992 | Ahearn et al. ........................ | 379/91 |
| 5,165,095 | 11/1992 | Borcherding .................... | 379/88.03 |
| 5,181,238 | 1/1993 | Medamana et al. .............. | 379/93.02 |
| 5,193,110 | 3/1993 | Jones et al. ....................... | 379/93.14 |
| 5,210,789 * | 5/1993 | Jeffus et al. ......................... | 379/127 |
| 5,287,403 * | 2/1994 | Atkins et al. ........................ | 379/144 |
| 5,325,421 * | 6/1994 | Hou et al. .............................. | 379/67 |
| 5,353,335 * | 10/1994 | D'Urso et al. ......................... | 379/67 |
| 5,369,685 | 11/1994 | Kero .................................. | 379/88.04 |
| 5,392,343 * | 2/1995 | Davitt et al. ......................... | 379/212 |
| 5,452,341 | 9/1995 | Sattar ................................ | 379/88.27 |
| 5,479,494 * | 12/1995 | Clitherow ............................. | 379/144 |
| 5,483,579 | 1/1996 | Stogel ................................ | 379/88.03 |
| 5,499,288 | 3/1996 | Hunt et al. ........................ | 379/88.02 |
| 5,509,060 | 4/1996 | Hall et al. ............................ | 379/207 |
| 5,511,114 * | 4/1996 | Stimson et al. ...................... | 379/114 |
| 5,517,558 | 5/1996 | Schalk ............................... | 379/88.02 |
| 5,559,871 * | 9/1996 | Smith ................................. | 379/115 |
| 5,675,707 | 10/1997 | Gorin et al. ......................... | 704/257 |
| 5,689,552 * | 11/1997 | Gibilisco ............................. | 379/145 |
| 5,703,935 * | 12/1997 | Raissyan et al. ................. | 379/88.18 |
| 5,859,897 * | 1/1999 | Furman et al. ................... | 379/88.01 |
| 5,859,900 * | 1/1999 | Bauer et al. ........................ | 379/144 |
| 5,901,284 * | 5/1999 | Hamdy-Swink .................... | 395/186 |
| 5,903,636 * | 5/1999 | Malik ................................. | 379/142 |
| 5,987,118 * | 11/1999 | Dickerman et al. ................ | 379/265 |

* cited by examiner

*Primary Examiner*—Fan Tsang
*Assistant Examiner*—Allan Hoosain
(74) *Attorney, Agent, or Firm*—Jackson Walker L.L.P.

(57) ABSTRACT

A voice enhanced phone card which allows a caller to place a call by voice activated dialing only when the caller desires it is presented. A caller places a call using a standard calling card switch number and enters a predetermined service code. The voice enhanced phone card system recognizes the service code, and using known telephone switching capabilities, switches the call to a voice activated dialing system at a main feature point in the voice activated dialing system call flow. The call is then connected to a destination using the voice activated dialing routine.

14 Claims, 5 Drawing Sheets

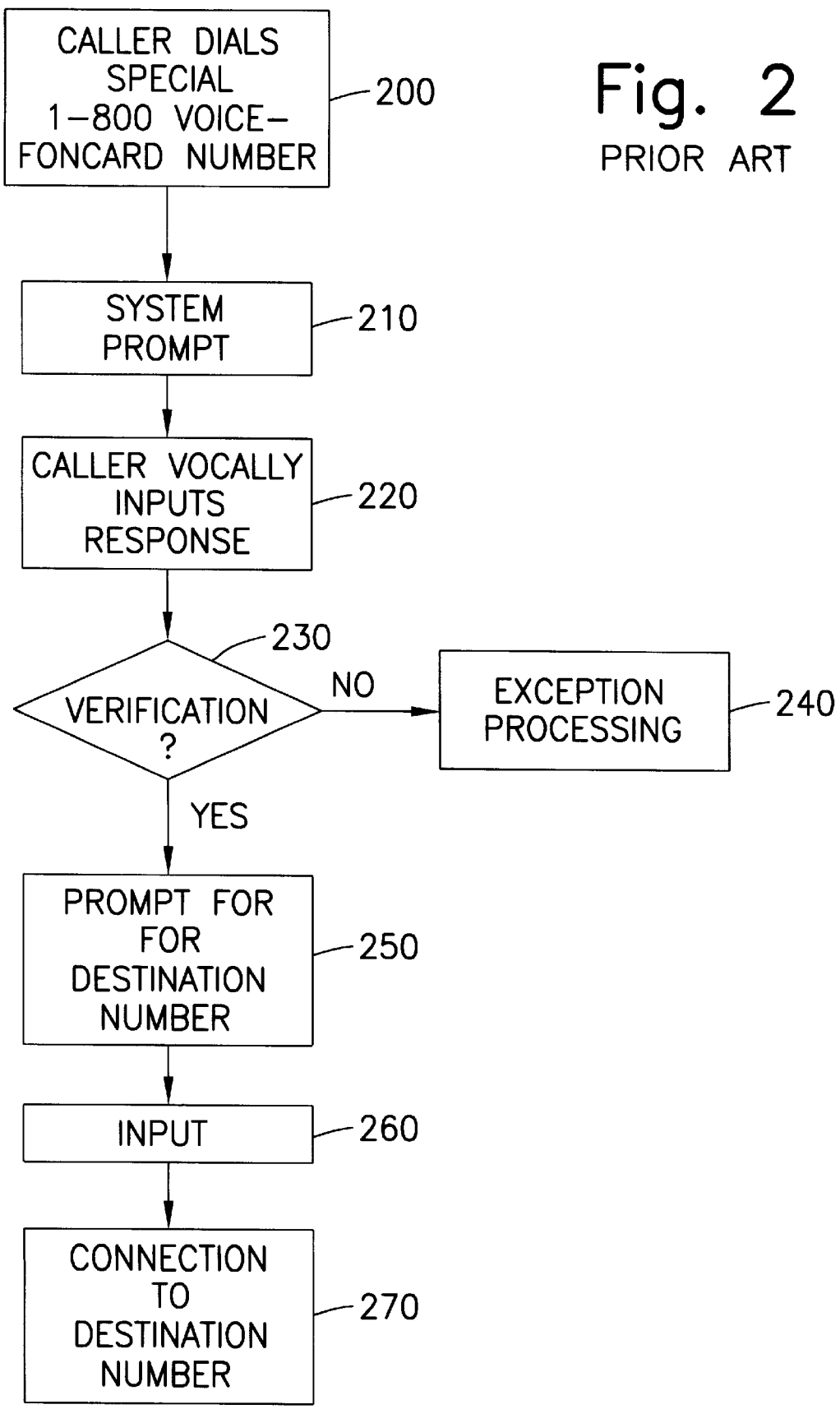

VOICE ENHANCED PHONE CARD

BACKGROUND INFORMATION

1. Field of the Invention

The present invention relates to a voice enhanced phone card, and more particularly, to a method for adding a voice activated dialing option to a standard calling card.

2. Description of the Art

Both business and pleasure travel has increased over the years. So to has the need for individuals to stay in touch while traveling. Further, in traveling, individuals are also often pressed for time—time which is better spent not having to deal with complicated communication systems. Thus busy, and often travel weary, individuals do not want to have to deal with a complicated system of communication which will consume their limited amount of time. As such, while communication service providers have begun to look for ways to enhance their services, there is a need for a communication system which is not overly time consuming.

For example, U.S. Pat. No. 5,517,558, issued on May 14, 1996 to Schalk, relates to a method and apparatus for performing a voice recognition routine and a voice verification routine so that a caller may gain access to a telephone network's services. Upon placement of a call into the network, a caller is prompted for a password. The spoken password is subjected to the voice recognition routine to determine each digit of the spoken password. Once the password has been recognized, the system determines if the password is valid. If the password is determined to be valid, the spoken password is then subjected to the voice verification routine. Verification of the caller's identity is based upon a comparison of the spoken password to voice reference data which has been previously stored in a database. Additional information may be requested from the caller to continue the voice verification routine. Once verification of the caller has been confirmed, the caller is allowed to access the telephone network's services. The implementation of the individual recognition and verification routines, however, takes additional time before allowing the caller to access the network's services.

Another example, U.S. Pat. No. 5,483,579, issued on Jan. 9, 1996 to Stogel, relates to a method and apparatus for an automated dialing system using voice recognition. The system is activated automatically when a caller picks up a telephone handset to place a call. With the dial tone present, the caller may then either dial as usual or implement the system by speaking a preprogrammed instruction, such as an individual's name. The system essentially eliminates the dial tone and conducts voice recognition on the spoken instruction. If the instruction is recognized, the system automatically dials the appropriate number. If the system does not recognize the instruction, the system may go "off-line". Off-line processing returns the phone to normal operation and the caller is left to enter the telephone number by dialing, thus taking additional time.

Yet another example, U.S. Pat. No. 5,369,685, issued on Nov. 29, 1994 to Kero, relates to a telephone directory and call placement system which is voice activated. During a call, a caller's identity is verified using a passcode. Upon verification, the system retrieves the identified caller's directory and prompts the caller to speak the name or identifier of a sub-directory. The response is then matched to the caller's sub-directory and the sub-directory is retrieved. If subsidiary sub-directories exist within a sub-directory, the system will continue to prompt the caller for retrieval of any subsidiary sub-directories until the end of that directory "branch" is reached. The system will then prompt the caller for the specific listing, and may initiate dialing of that listing upon the appropriate spoken command. While the search time of a complete directory may be reduced, the voice activated retrieval of the appropriate sub-directories still takes time.

Thus, as can be seen from the above examples, there is a need to further increase enhancements to communication services, diminish complications resulting from such enhancements and save time for the subscribers.

SUMMARY OF THE INVENTION

Accordingly, an object of the present invention is to allow completion of a telephone call according to a caller's preferences without an excessive use of the caller's time to establish connection of the call to the desired number.

Another object of the present invention is to provide a method for adding the enhancement of a voice activated dialing option to a standard calling card which may be used by an individual quickly and inexpensively.

Yet another object of the present invention is to take advantage of existing technology and proven capabilities of calling card connection networks (platforms and switches) in a novel fashion by adding a voice activated dialing option to a calling card that a caller may select on a call by call basis.

To achieve the foregoing and further objectives, and in accordance with the purposes of the present invention, as embodied and broadly described herein, the present invention is directed to a voice enhanced phone card which uses the pre-existing calling card systems and call flow, coupled with known telephone switching capabilities, to permit a caller to access voice activated dialing only when the caller desires it. Thus, the present invention allows a caller to access voice activated dialing during the normal process of using a calling card by dialing the standard calling card connection number and inputting a special service code, rather than a destination number. Alternatively, the use of the existing calling card systems and call flow allows the caller to directly bypass voice activated dialing when such dialing is not wanted.

A caller initiates a telephone call using a standard toll free (i.e., 1-800, 1-888, etc.) calling card service number presently used by telephone service providers. After connection to the calling card service number, the caller, instead of entering the destination telephone number of the party the caller wishes to reach, enters a service code for the service of voice activated dialing. Entry of the voice activated dialing service code, instead of a destination number, lets the system know that the caller wishes to use the special service of voice activated dialing. After entry of the service code, the caller then enters the calling card identification number and associated passcode in the usual fashion. The voice enhanced phone card system then conducts a validation of the calling card identification number and passcode.

Upon validation of the calling card identification number and passcode, the voice enhanced phone card system uses the service code entered by the caller to actuate a telephone switch. The telephone switch, which is known in the art, recognizes the service code as an internal destination number to the special service of voice activated dialing and transfers the call to that requested service. In transferring the caller to the service, the switch enters the voice activated dialing service at the main feature point of the requested service and not at its start point. In other words, the caller need not go through the identification and verification process again or any other introductory prompts. Thus, upon connection to the voice activated dialing, the voice enhanced calling card system allows the caller to simply input the destination number or party by voice.

The present invention and its features and advantages will become more apparent from the following detailed description with reference to the accompanying drawings.

BRIEF DESCRIPTION OF THE DRAWINGS

FIG. 2 illustrates a flow chart diagram of a prior art method of originating and completing a call using a voice phone card and associated special 1-800 telephone number according to an embodiment of the Sprint Voice-FONCARD™ calling card servce platform.

DETAILED DESCRIPTION OF THE INVENTION

Figure 1:
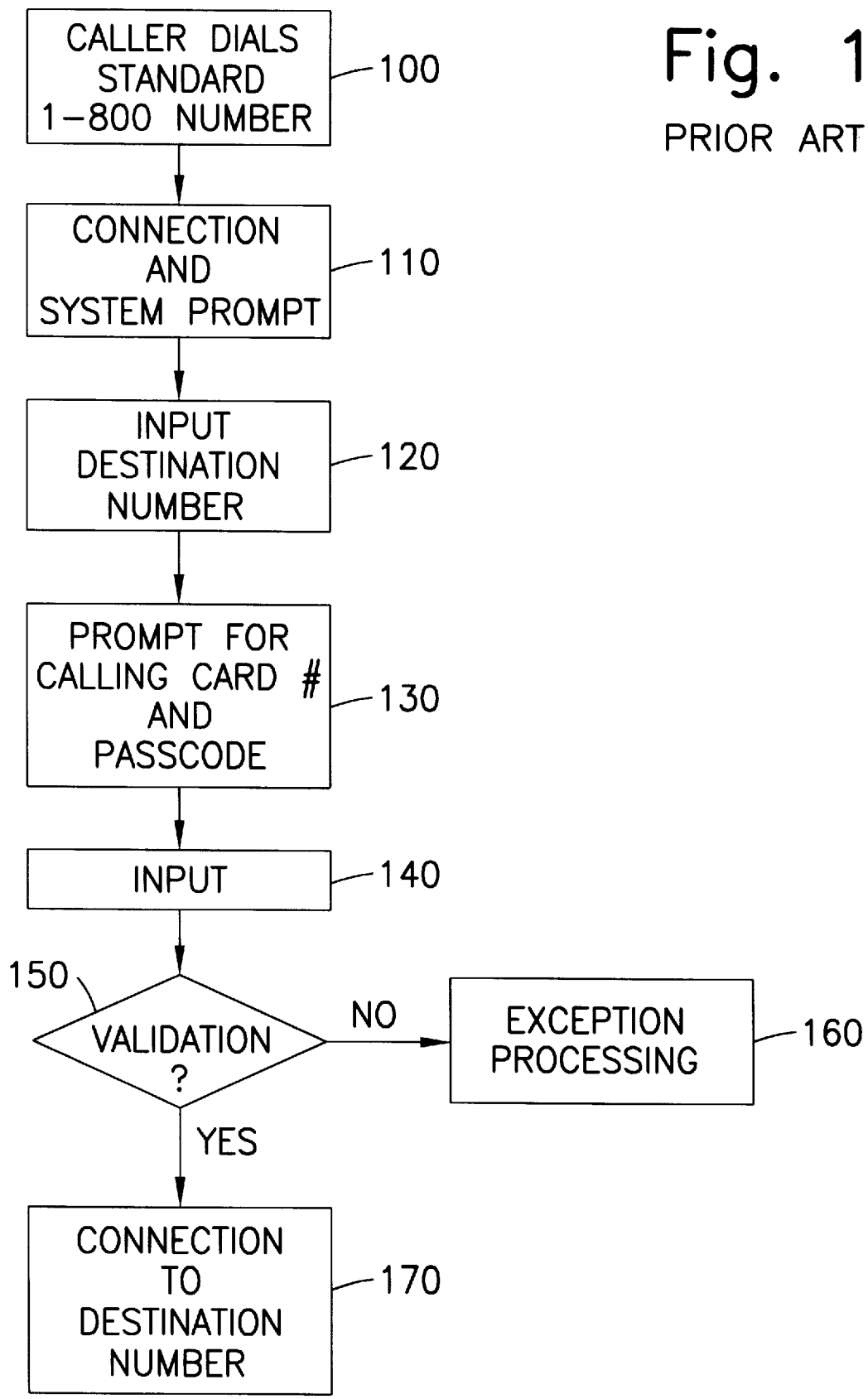
FIG. 1 illustrates a flow chart diagram of a prior art method of originating and completing a call using a standard phone card and associated standard 1-800 telephone number according to an embodiment of the Sprint FONCARD™ calling card service platform.

In each of FIGS. 1 to 3, calls are originated and completed using a calling card service platform—that is, a dedicated service platform established by a telephone service provider to handle all calling card calls. Any type of calling card service platform may be used for each method shown, however, for this description Sprint's FONCARDE™ and Voice-FONCARD™ platforms are used in the exemplary embodiment. It is to be understood that the present invention could be readily adapted to other service platforms by those skilled in the art.

Sprint's FONCARD™ platform is based on a standard 1-800 number which the calling card subscriber calls to place a standard calling card call. Thus, this standard 1-800 is assigned to all Sprint calling card subscribers as the general access number to the calling card platform. Calling card subscribers can use this platform to make relatively inexpensive calling card calls.

Alternatively, Sprint also has a Voice-FONCARD™ platform which has a set of special 1-800 numbers. Only subscribers to Sprint's Voice-FONCARD™ service can access the Voice-FONCARD™ service by way of one of the special 1-800 numbers. Thus, subscribers to Sprint's Voice-FONCARD™ must use a special 1-800 number to specifically access this calling card platform. The use of the special 1-800 number and the Voice-FONCARD™ platform to place a calling card is more expensive than using the standard number, and additionally takes more time. However, the Voice-FONCARD™ platform allows a calling card subscriber to complete calls using the enhanced service of voice activated dialing.

Thus, as shown, within the appropriate calling card platform, each of the above two calling card platforms has a different 1-800 calling number which the service subscriber calls to gain access to the system. Each system has its specific advantages and disadvantages relating to, inter alia, expense, time consumption and ease of use.

The voice enhanced phone card of the present invention takes the approach of allowing a calling card system subscriber to inexpensively and quickly access voice activated dialing while still using the standard toll free (i.e., 1-800, 1-888, etc.) number. Thus, for example, the subscriber of Sprint's FONCARD™ platform may use the voice activated dialing features of Sprint's Voice-FONCARD™ platform. The present invention thus combines existing technology using the standard 1-800 calling card number, and the voice activated dialing feature and the switching capabilities of the telephone network in a novel fashion. Further, the present invention requires no, or very little, protocol change to the existing calling card platforms and networks.

Referring to FIG. 1, the currently known and in use Sprint FONCARD™ platform will be described generally. It is thus to be understood that the description contained herein of the Sprint FONCAR™ platform is not to be considered as limiting in any way, and is used simply as an example as one embodiment of the prior art. In step 100, a calling card service subscriber of the Sprint FONCARD™ platform dials the standard 1-800 number to place a calling card call. A connection is made to the platform in step 110 and a system prompt (i.e., a dialtone) is played to the subscriber. Such prompt is known by the subscriber as an instruction to enter the appropriate destination telephone number. Thus, in step 120, the subscriber responds by entering the telephone destination number of the party the subscriber wishes to contact. In this case the subscriber must enter the destination number by use of the telephone keypad.

Once the subscriber has entered the destination number, in step 130 the FONCARD™ platform prompts the subscriber for the calling card number and an associated passcode (i.e., "pin number") for the calling card. The prompt for the Sprint FONCARDM™ platform is a "Bong" sound, which is known by the subscriber as an instruction to enter the calling card number and associated passcode. Thus in response, the subscriber enters the requested information in step 140, again using the telephone keypad. Upon receipt, in step 150, the FONCARD™ platform performs a validation of the calling card number and passcode which the subscriber has input. Validation of the calling card number and passcode may be performed by matching the input numbers to previously stored numbers, or may be in any fashion which confirms the passcode as belonging to the calling card number. If the calling card number and the passcode are not verified, exception processing takes place in step 160. Exception processing may include processing such as re-prompting the subscriber to input the number and passcode again, re-routing the calling subscriber to a live operator, or even disconnecting the call completely. On the other hand, if the calling card number and passcode are verified, the FONCARDw platform connects the subscriber to the requested destination number by dialing the destination number in step 170. Such connection may be performed using Dual Tone Multi-Frequency (DTMF), Signaling System 7 (SS7) or any other method by which the connection can be completed. The subscriber may then communicate with the party at the destination number.

Referring to FIG. 2, the currently known and in use Sprint Voice-FONCARD™ calling card service platform will be described generally. It is thus to be understood that the description contained herein of the Sprint Voice-FONCARD™ platform is not to be considered as limiting in any way, and is used simply as an example as one embodiment of the prior art. In step 200, a calling card subscriber who wishes to place a calling card call using a Voice Activated Dialing (VAD) service calls a special 1-800 number. This special 1-800 number is a dedicated telephone number for the Sprint Voice-FONCARD™ calling card platform which uses VAD for dialing and connection to a destination telephone number for the subscriber. A connection to the platform is made in step 210 and a system prompt is played to the subscriber. The system prompt may be to request the subscriber's account number, name, passcode or any other such needed identity data. In step 220 the subscriber responds verbally to the prompt giving the information which was requested.

Upon receipt of the appropriate response, the Voice-FONCARD™ platform then, in step 230, verifies the identity of the subscriber. Verification of the subscriber can be performed in any manner suitable for verifying identity. For instance, verification may be performed by matching the subscriber's vocal response against a pre-recorded voice print, or a pre-determined pin number may be used, etc. If verification of the identity of the calling subscriber is not confirmed, in step 240 exception processing is performed. As mentioned above, exception processing may include processing such as re-prompting the subscriber to input the number and passcode again, re-routing the calling subscriber to a live operator, or even disconnecting the call completely. On the other hand, if the identity of the calling subscriber is verified, in step 250 the Voice-FONCARD™ platform prompts the subscriber for the destination number with a "place call" prompt.

In step 260 the subscriber inputs the destination telephone number of the party with which the subscriber wishes to communicate. As the subscriber has called the special 1-800 number of the Sprint Voice-FONCARD™ platform, the subscriber has the added option of entering the destination telephone number by speech, rather than only by key pad (i.e., DTMF). Thus, if the subscriber wishes to use the voice activated dialing, the subscriber may enter the destination number by speaking the name the subscriber has associated with the destination number, such as the individual or place to which the subscriber is calling. Other VAD platforms may allow the subscriber to enter the destination number by simply speaking the numeric digits. Upon entry of the telephone destination number, in step 270 the system recognizes the number using known voice recognition routines and then connects the call. Upon connection the subscriber may then communicate with the desired party at the destination number.

Figure 3A:
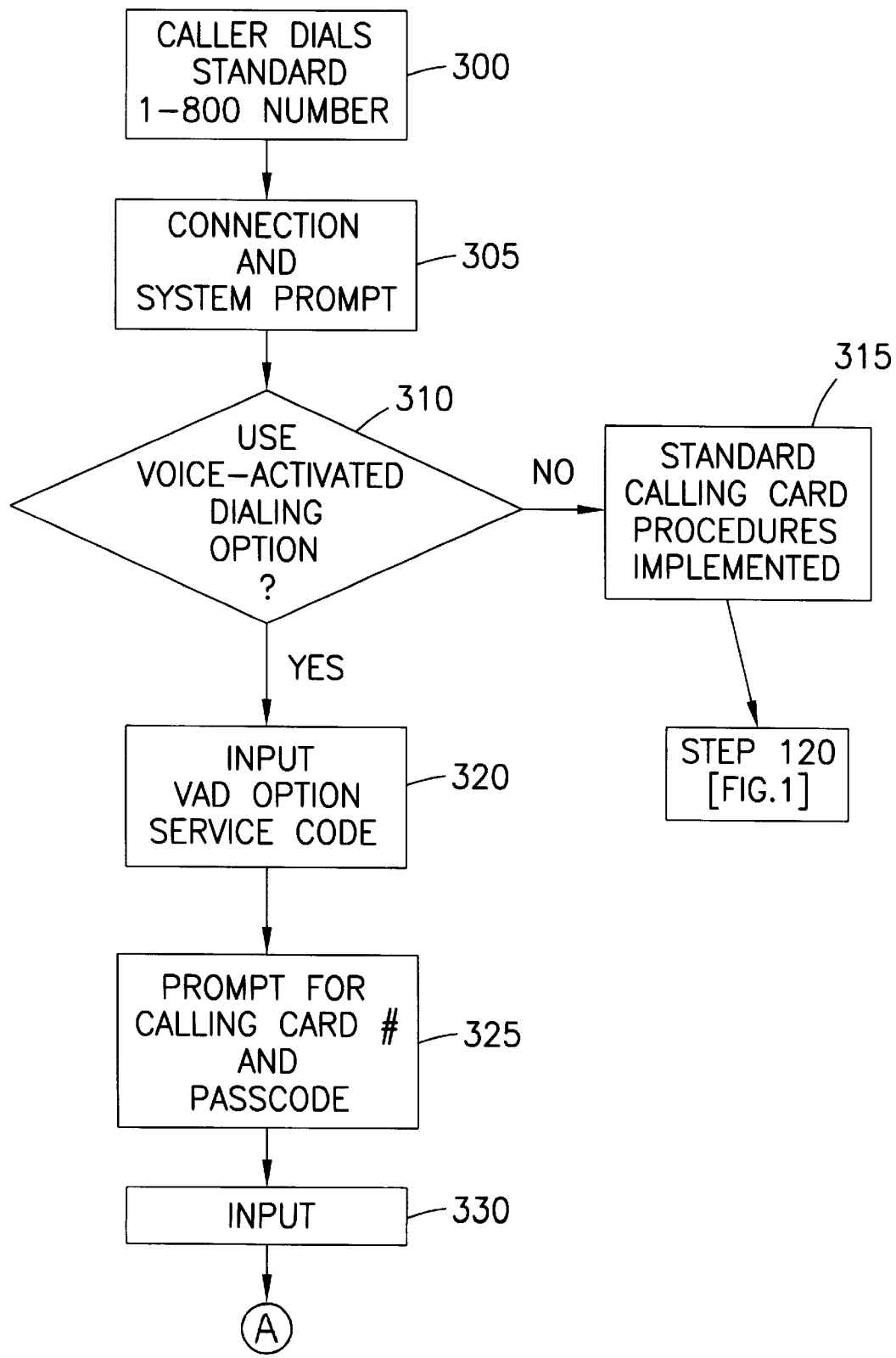
FIGS. 3a and 3b illustrate a flow chart diagram of a method of originating and completing a call using the voice enhanced phone card, according to an embodiment of the present invention.
Figure 3B:
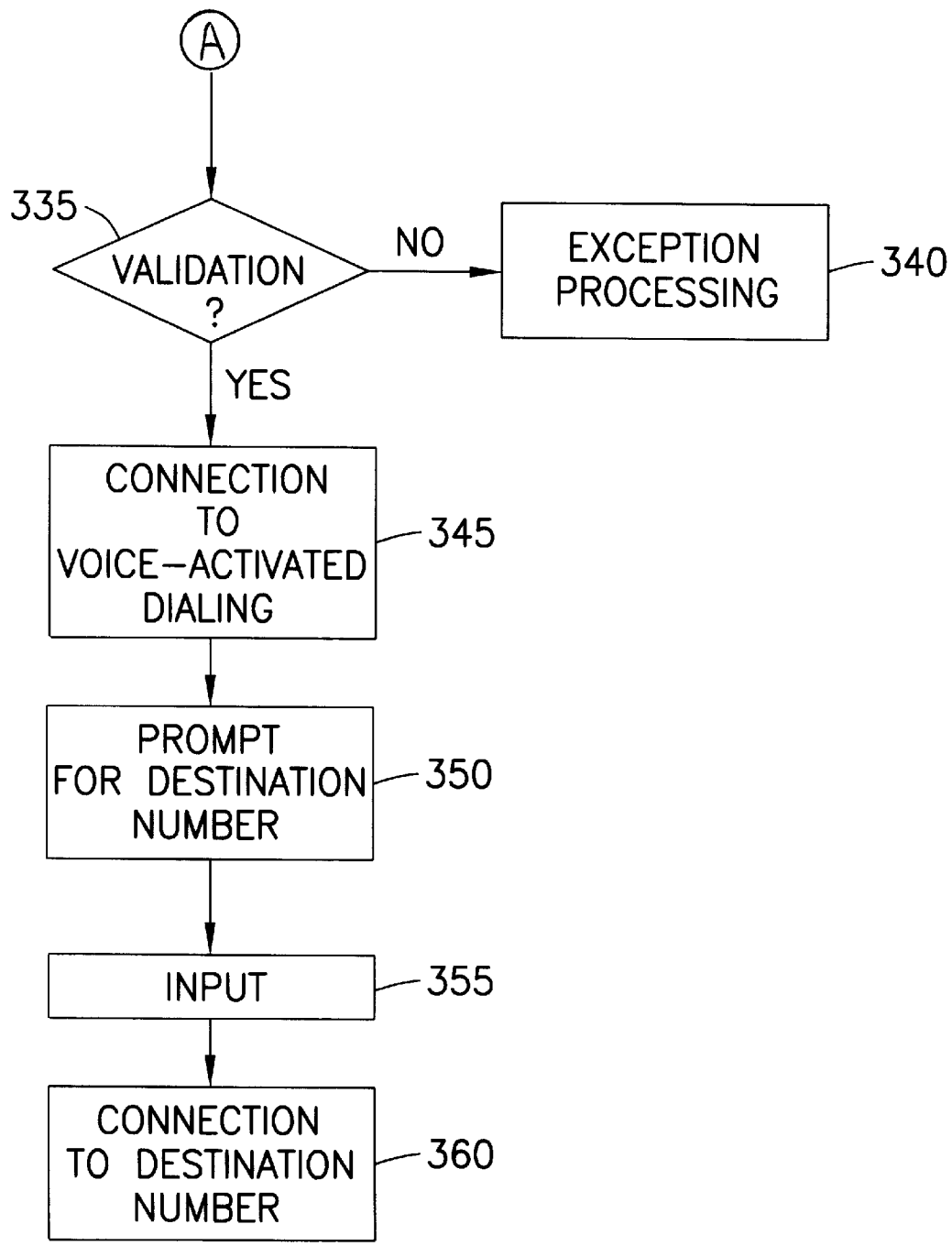

Referring to FIGS. 3a and 3b, the voice enhanced phone card according to the present invention combines the current technology of a standard calling card call flow using DTMF-only dialing with that of the voice activated dialing feature of a special calling card, thus giving the subscriber the option of inexpensively and quickly using either VAD or DTMF to connect to a destination number. As an exemplarary embodiment, and as explained above, the present invention is explained in light of Sprint's FONCARD™ and Voice-FONCARD™ calling card platforms. It is to be understood, of course, that the method of the present invention may be applied to any calling card service provider's platform.

In step 300, a calling card subscriber dials a standard 1-800 calling card service number to place a calling card call to a destination telephone number. While it is to be understood that the 1-800 number may be the standard toll free calling card service number for any calling card service provider, in this exemplarary embodiment the calling card service number is Sprint's standard 1-800 FONCARD™ number. The standard 1-800 FONCARD™ number is an inexpensive and quick method by which a calling card service subscriber may place a calling card call. In step 305, as in step 110, the connection is made to the calling card service platform and the subscriber is prompted to enter a destination telephone number for the party with which the subscriber wishes to communicate. As explained above, the prompt may be simply a request to enter the destination telephone number. The destination number may be entered by DTMF, or spoken (with subsequent voice recognition and processing) as discussed below.

Upon receipt of the system prompt for input of a destination telephone number, the subscriber is presented with the option of whether to use VAD or DTMF dialing. Thus in step 310, the subscriber is given a choice. The ability to choose which route to take (i.e. how to proceed with the connection) may be important to the subscriber given the situation. If the subscriber's choice is to use DTMF dialing, the subscriber simply enters the destination telephone number by using the telephone keypad and the system continues with the usual call flow in step 315 as used in the prior art Sprint's FONCARD™ service platform. In other words, the standard calling card procedures (call flow) are implemented (i.e., steps 120–130 in FIG. 1).

If the subscriber's choice is to use VAD, then in step 320 the subscriber simply enters a VAD option service code rather than the destination telephone number. The VAD option service code can be any length and any grouping of characters, letters and/or numbers. The VAD option service code is only limited by the constraints of the "look-up" table located at the service provider, and perhaps by what the average subscriber can remember. As an example, the VAD option service code may be "*VAD" or "#56", depending on the structure of the particular service provider's protocol.

Although the subscriber has input a choice to implement the VAD option, at this point, in step 325, the system continues as it would under the FONCARDI platform call flow and prompts for the subscriber's calling card number and associated passcode. Thus in step 330, the subscriber inputs his or her calling card number and associated passcode (either by voice or DTMF).

In step 335 the calling card service platform carries out validation of the calling card number and associated passcode. If validation is unable to be confirmed, in step 340 exception processing is implemented. As mentioned above, exception processing may include processing such as re-prompting the subscriber to input the number and passcode again, re-routing the calling subscriber to a live operator, or even disconnecting the call completely.

On the other hand, if the calling card number and associated passcode are determined to be valid, in step 345 a connection to a voice activated dialing service is made. Since the subscriber has made the choice to use the voice activated dialing feature rather than DTMF dialing, the system recognizes the VAD option service code and connects the subscriber to the Voice-FONCARD™ platform. The connection to the Voice-FONCARD™ platform, however, is not to the beginning of the call flow for the Voice-FONCARD™ platform, but directly to the main feature point. That is, the connection is made to the voice-activated dialing service at that point where the "place call" prompt is given, thus taking advantage of the call flow of the Sprint Voice-FONCARD™ calling card service platform. This is step 250 in FIG. 2.

The connection itself is performed using standard switches and switching procedures currently in use. One such switch is the Nontel DMS250 switch, which has the capability to recognize the VAD option service code, input by the subscriber previously in step 320, as a destination number to a special service. Thus, when the VAD option service code is selected, the DMS250 switch does a table look-up to determine which internal or external destination number is associated with the VAD service. The DMS250 switch then uses that number to connect the caller to the VAD service platform. It is to be understood, of course, that any switch capable of recognizing the VAD option service code as corresponding to a VAD platform and of connecting the caller to the VAD service platform associated with the service code can be used.

Upon connection to the Voice-FONCARD™ platform, processing and connection of the call proceeds as in steps 250, 260 and 270 explained above. That is, in step 350, the system prompts the subscriber for the destination number and, in step 355, the subscriber inputs in response the destination telephone number of the party with which the subscriber wishes to communicate. As the subscriber is now connected to the Sprint Voice-FONCARD™ platform, the subscriber has the option of entering the destination telephone number by either speech or by key pad. Again, as explained above, if the subscriber chooses to input the destination number by speech, the subscriber may input the name of the person or place the subscriber is calling, or may enter the destination number by speaking each digit of the number. Upon entry of the telephone destination number, in step 360 the system recognizes the number and connects the call. Upon connection the subscriber may then communicate with the desired party at the destination number.

Figure 4:
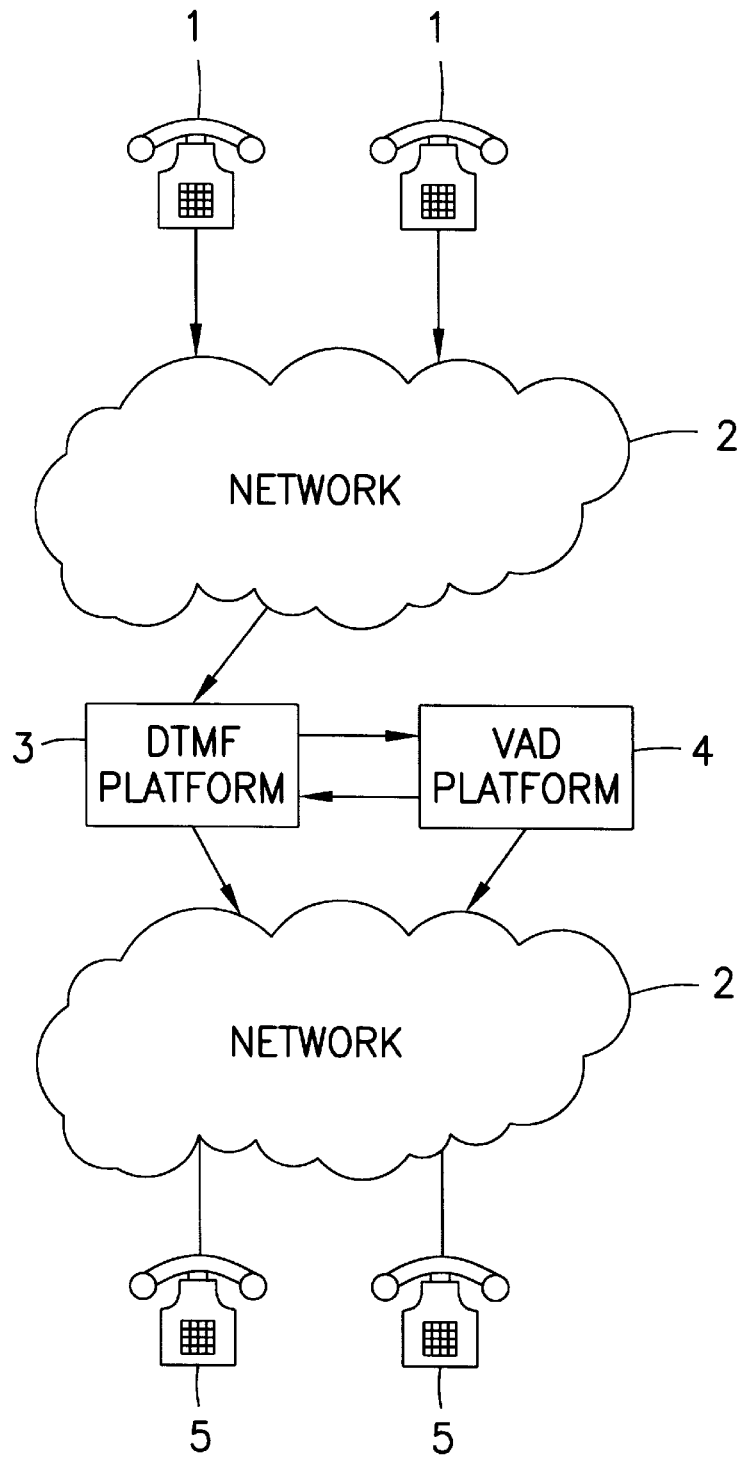
FIG. 4 illustrates an overview of the general system architecture of the telephone network and service platforms used in connecting telephone calls, according to an embodiment of the present invention.

Referring to FIG. 4, an overview of the system architecture of the telephone network and service platforms used in connecting a call from a calling card service subscriber to a destination number is shown. A call from the subscriber is connected from a telephone 1 through the network 2 to a DTMF platform 3. DTMF platform 3 and VAD platform 4 are connected to each other by the method of the present invention as described above. Thus based on the subscriber's choice of dialing option, the call is completed back through the network 2 to a destination telephone 5 by either the DTMF platform 3 or the VAD platform 4.

It should be noted that the method of the present invention described above has the ability to allow the subscriber to "back-up" and/or "re-originate" the call if the subscriber so desires. That is, the subscriber has the options, at any time in the steps shown above, to re-implement a step by backing up to it, or to start the call flow over again from the beginning or some other point. For instance, if the subscriber wishes to "back-up" because the subscriber did not understand one of the system prompts played, the subscriber may have the system prompt repeated by entering a touch-tone signal. The system will then repeat the step of playing the prompt. Further, for instance, if the subscriber wishes to place another call after a first call is complete, the subscriber may "re-originate" the method of the present invention to place the second or subsequent call by entering another touch-tone signal. The system will then sever the connection to the destination number and return to a point in the call flow to permit the subscriber to place the second or subsequent call. Both options of backing-up and re-origination may be repeated multiple times.

Thus, as has been shown, the voice enhanced phone card according to the present invention gives a calling card subscriber the added option of voice activated dialing when the subscriber so chooses. The choice thus given to the subscriber both serves to enhance calling card telephone service and saves both time and expense for the subscriber.

It is to be understood and expected that variations in the principles of the method herein disclosed in an embodiment may be made by one skilled in the art and it is intended that such modifications, changes, and substitutions are to be included within the scope of the present invention.

What is claimed is:

1. A method for connecting a calling card service subscriber to a destination number, comprising the steps of:

connecting a call from the subscriber to a first calling card service platform;

the first calling card service platform validating the subscriber;

recognizing a voice activated dialing option request by the subscriber;

connecting the call from the first calling card service platform to a second, voice activated dialing calling card service platform as a function of the voice activated dialing option request; and connecting the subscriber to the destination number.

2. The method according to claim 1, further comprising the step of:

recognizing the destination number by means for voice recognition.

3. The method according to claim 1, wherein the step of connecting the call to the first calling card service platform is through a toll-free telephone number.

4. The method according to claim 1, wherein when the call is switched to the second, voice activated dialing calling card service platform, a connection is made at a main feature point.

5. The method according to claim 1, wherein the voice activated dialing option service request is a code including at least one of characters, letters and numbers.

6. The method according to claim 1, wherein the second, voice activated dialing calling card platform has a dedicated toll-free telephone number.

7. The method according to claim 1, wherein the step of switching is carried out by a telephone switch capable of recognizing the voice activated dialing option request as corresponding to a destination number of the voice activated dialing calling card service platform.

8. A method for dialing a destination number using voice activated dialing, comprising the steps of:

connecting to a first calling card service platform;

prompting, by the first calling card service platform, for a voice activated dialing request;

prompting, by the first calling card service platform, for a calling card number and an associated passcode;

validating, by the first calling card service platform, the calling card number and the associated passcode;

connecting from the first calling card service platform to a second calling card service platform on the basis of the voice activated dialing request;

prompting, by the second calling card service platform, for a destination number;

recognizing, by the second calling card service platform, the destination number; and dialing, by the second calling card service platform, the destination number.

9. The method according to claim 8, wherein the first calling card service platform is a DTMF platform.

10. The method according to claim 8, wherein the second calling card service platform is a voice activated dialing platform.

11. The method according to claim 8, wherein the step of connecting to the second calling card platform is accomplished by a switch capable of recognizing the voice activated dialing request as a destination number for the second calling card platform.

12. The method according to claim 8, wherein the connection resulting from the step of connecting to the second calling card platform is made at a main feature point.

13. The method according to claim 8, wherein the voice activated dialing request is a code including at least one of characters, letters and numbers.

14. The method according to claim 8, wherein the step of recognizing the destination number is accomplished by means for voice recognition.

* * * * *